(No Model.)
P. HOWE.
CLOTH CUTTING MACHINE.
No. 472,172. Patented Apr. 5, 1892.
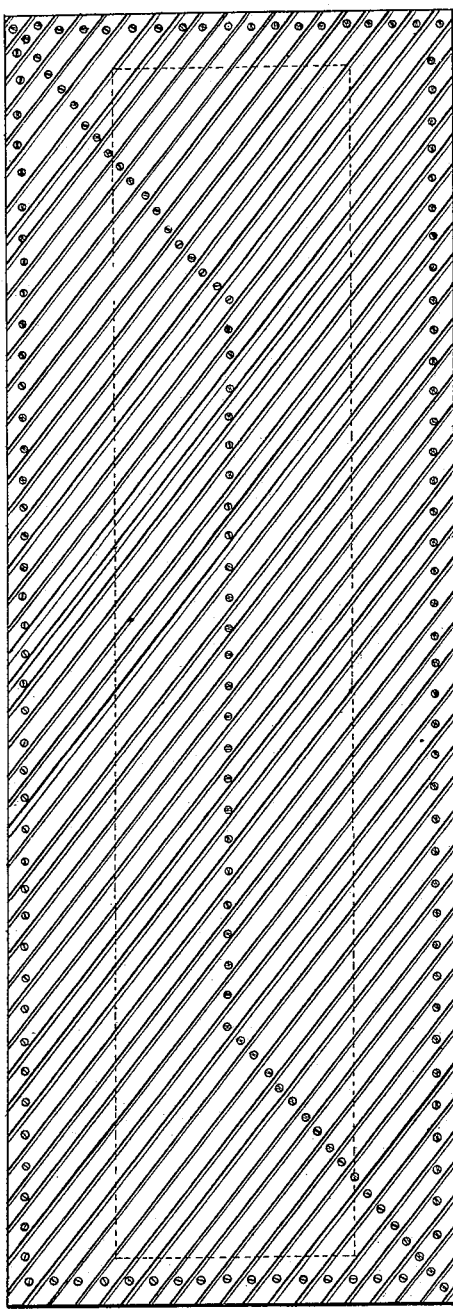
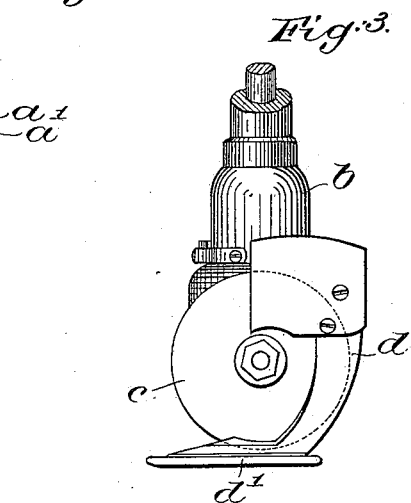
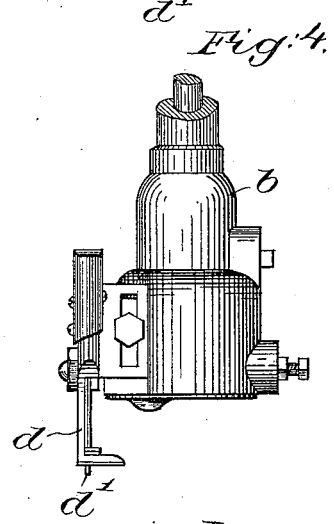
Witnesses.
Louis N. Cowell
Edward F. Allen
Inventor:
Patrick Howe.
By Crosby & Gregory Attys.

UNITED STATES PATENT OFFICE.

PATRICK HOWE, OF BOSTON, MASSACHUSETTS.

CLOTH-CUTTING MACHINE.

SPECIFICATION forming part of Letters Patent No. 472,172, dated April 5, 1892.

Application filed September 25, 1891. Serial No. 406,779. (No model.)

*To all whom it may concern:*

Be it known that I, PATRICK HOWE, of Boston, county of Suffolk, State of Massachusetts, have invented an Improvement in Cloth-Cutting Machines, of which the following description, in connection with the accompanying drawings, is a specification, like letters on the drawings representing like parts.

The trimming for the bottoms of ladies' dresses and for other purposes is now made by cutting cloth—such as velvet—bias, and thereafter joining or connecting several bias-cut strips together to make a long strip. In cutting the cloth in this manner it is important that the strips should be of the same width, and it is now customary in cutting cloth to lay several thicknesses on a table, mark it off with tailors' chalk, and then sever the material on the chalk-line by means of a cloth-cutting machine—such, for instance, as that commonly known as the "Fenno" cloth-cutting machine. Marking off the cloth is a long, tedious, as well as a difficult operation, and it is often the case that the strips when severed vary in width.

This invention has for its object to improve the construction of cloth-cutting machines whereby strips may be cut bias without the necessity of marking off the cloth, such strips all being of the same width.

In carrying out this invention my improvements are shown as applied to a cloth-cutting machine of the kind commonly known as the "Fenno" cloth-cutting machine, such as shown in United States Patent No. 129,327, dated July 16, 1872, and improvements thereon. The table upon which is laid the cloth to be cut is provided with parallel grooves preferably arranged diagonally, said grooves being of the width that it is desired to cut the strips, and the shoe which is attached to the knife or cutter carrying head is provided upon its under side with a guide-rib adapted to follow along in the grooves on the table, and thereby guide the head and knife carried by it to cut off the strips of equal width.

Figure 1 shows in plan view the surface of a table provided with parallel grooves in accordance with this invention; Fig. 2, an end view of a portion of the table shown in Fig. 1; Fig. 3, a side view of a knife-carrying head having a shoe provided with a guide-rib embodying this invention, and Fig. 4 an end view of the knife-carrying head shown in Fig. 3.

To the surface of the table is screwed or otherwise secured a series of strips $a$, of metal or other suitable material, placed a short distance apart to present grooves $a'$. As represented in Fig. 1, these strips are arranged diagonally to present a series of parallel diagonal grooves.

The knife-carrying head $b$ may be of any usual or suitable construction supporting a rotary knife $c$, and a shoe $d$, which is adapted to follow along beneath the goods being cut. The shoe $d$ has formed upon its under side a guide-rib $d'$, herein represented as made longer than the shoe to project therefrom at both the heel and toe, as shown in Fig. 3. The cloth to be cut is laid upon the table and the knife-carrying head is moved by the operator from side to side, the guide-rib $d'$, following along the grooves $a'$, being guided thereby. By constructing the surface of the table in this way and providing a guide-rib on the shoe of the knife or cutter carrying head it will be seen that narrow strips of equal width may be cut very readily.

I do not desire to limit my invention to any particular construction of knife-carrying head, as it is obvious that any construction of head provided with a guide-rib, such as $d'$, adapted to follow along the grooves $a'$, will come within the spirit and scope of this invention. Nor do I desire to limit my invention to arranging the grooves on the surface of the table diagonally, as shown.

I claim—

In a cloth-cutting machine, a table the surface of which is provided with parallel grooves, combined with a movable knife or cutter carrying head provided with a shoe having a guide-rib upon its under side to enter one of said grooves and thereby guide the head, substantially as and for the purposes specified.

In testimony whereof I have signed my name to this specification in the presence of two subscribing witnesses.

PATRICK HOWE.

Witnesses:
BERNICE J. NOYES,
EMMA J. BENNETT.